United States Patent [19]

Tsuji et al.

[11] 4,321,233

[45] Mar. 23, 1982

[54] COMBUSTION FURNACE OR REACTOR WITH MULTI-STAGE FLUIDIZED BED SYSTEM

[75] Inventors: Shoichi Tsuji, Hoya; Kiyoshi Aoki, Chiba; Minoru Asai, Kamagaya, all of Japan

[73] Assignee: Ishikawajima-Harima Jukogyo Kabushiki Kaisha, Tokyo, Japan

[21] Appl. No.: 93,279

[22] Filed: Nov. 13, 1979

[30] Foreign Application Priority Data

Nov. 11, 1978 [JP] Japan ............................... 53/139185

[51] Int. Cl.[3] ............................................... B01J 8/28

[52] U.S. Cl. ...................................... 422/142; 48/210; 422/143; 422/145; 431/7; 431/170

[58] Field of Search ............... 422/142, 143, 145, 171, 422/172, 173, 176, 194, 195; 201/17, 31; 48/77, 210; 431/7, 170

[56] References Cited

U.S. PATENT DOCUMENTS

| | | | |
|---|---|---|---|
| 2,529,366 | 11/1950 | Bauer | 422/142 X |
| 3,565,593 | 2/1971 | Moore | 422/143 X |
| 3,905,336 | 9/1975 | Gamble et al. . | |
| 4,135,885 | 1/1979 | Wormser et al. | 422/142 |

*Primary Examiner*—Barry Richman
*Attorney, Agent, or Firm*—Alfred E. Miller

[57] ABSTRACT

A combustion furnace or reactor with a multi-stage fluidized bed system wherein upper and lower fluidized bed formation zones in which the fluidized beds of bed particles containing particles of lime stone are separated through a partition device. The partition device is provided with a plurality of exhaust gas distribution holes for distributing the exhaust gases produced in the lower fluidized bed into the upper fluidized bed and a plurality of nozzles through which issue the combustion air and/or recirculated exhaust gases into the upper fluidized bed. Combustion products such as $NO_x$ and $SO_x$ are desulfurized and denitrified respectively within the reactor by calcium compounds which absorb $SO_2$ and act as catalysts for reducing $NO_x$.

1 Claim, 6 Drawing Figures

COMBUSTION FURNACE OR REACTOR WITH MULTI-STAGE FLUIDIZED BED SYSTEM

BACKGROUND OF THE INVENTION

The present invention relates to a combustion furnace or reactor with a multi-stage fluidized bed system.

There have been recently devised and demonstrated boiler furnaces employing a fluidized bed combustion system for burning coal, but further extensive research and development is needed to reduce the emission of nitrogen oxides $NO_x$ and sulfur oxides $SO_x$ to a minimum. To this end, there has been devised and demonstrated a system wherein particles of lime stone are used as bed materials or particles so that $NO_x$ and $SO_x$ may be removed by calcium compounds which can absorb sulfer oxides and can act as catalysts for reducing $NO_x$. The boiler furnaces with a single fluidized bed of particles of lime stone have been used in practice, but they are not satisfactory in view of the higher pollution control standards.

The main reason is that even though the removal of nitrogen oxides $NO_x$ may be made most effectively in the reducing atmosphere while the removal of sulfur oxides $SO_x$, in the oxidizing atmosphere, only one fluidized bed is used to effect both desulfurization and denitrification.

In order to overcome the above problem, according to the present invention, the furnace or reactor is divided into a lower denitrification zone and an upper desulfurization zone wherein the fluidized beds of particles of lime stone are formed. Since the lower and upper zones may be optimumly operated independently of each other, effective denitrification and desulfurization may be attained to an extent hitherto unattainable by any prior art single fluidized bed systems.

In order to attain satisfactory denitrification and desulfurization and to inhibit the production of thermal $NO_x$ with the combustion furnace or reactor with a multi-stage fluidized bed system of the type described above, the following factors must be taken into consideration:

(1) Combustion air must be charged in such a way that the lower fluidized bed may have the reducing atmosphere while the upper fluidized bed may have the oxidizing atmosphere.

(2) Calcium compounds such as CaO, $CaSO_3$, $CaSO_4$ and the like which act as catalysts in denitrification must be positively supplied from the upper desulfurization zone to the lower denitrification zone.

(3) All of the reducing gases resulting from the lower denitrification zone must be made to pass through the upper desulfurization zone and burned with the secondary combustion air so as to burn unburned combustables.

(4) Production of thermal $NO_x$ must be suppressed as much as possible in the upper desulfurization zone.

The primary object of the present invention is therefore to provide a combustion furnace or reactor with a multi-stage fluidized bed system which may satisfactorily meet all the conditions described above. The present invention will become more apparent from the following description of preferred embodiments thereof in conjunction with the accompanying drawings.

DETAILED DESCRIPTION OF THE EMBODIMENTS

Figure 1:
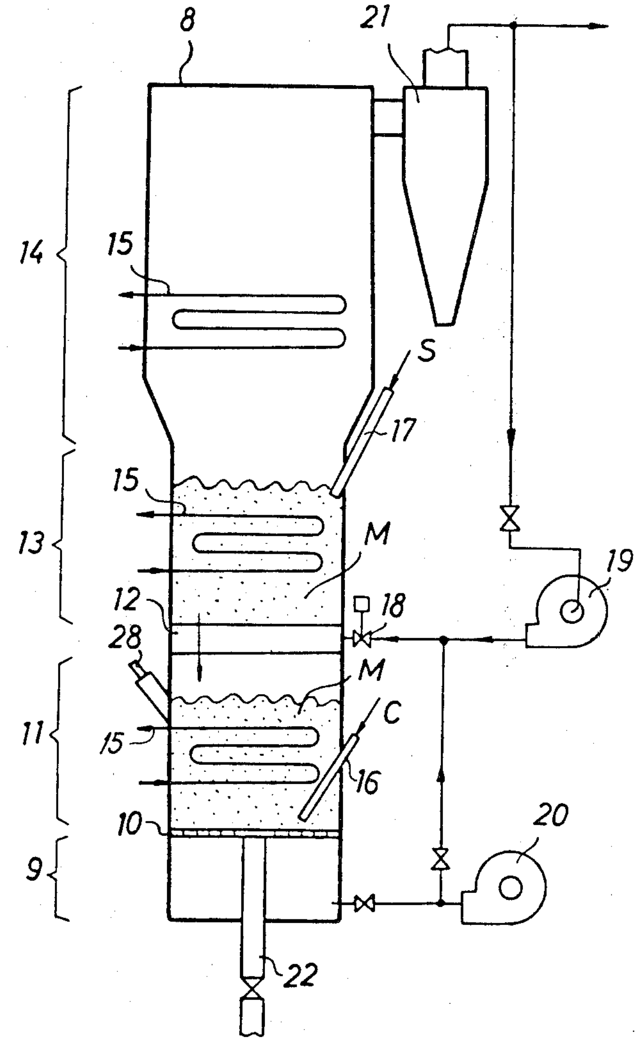
FIG. 1 is a schematic longitudinal view of a combustion furnace or reactor embodying the present invention.

First referring to FIG. 1, a combustion furnace 8 is divided in general by a partition device 12 into an upper portion and a lower portion. Coal is fed as fuel to a lower or primary fluidized bed 11 while lime stone is fed to an upper or secondary fluidized bed 13. Combustion air is supplied to the upper and lower fluidized beds 13 and 11 independently or separately. Recirculated exhaust gases are fed only to the upper fluidized bed 13. Calcium compounds are dropped from the partition device 12 into the lower fluidized bed 11. Incomplete combustion of coal is carried out in the lower fluidized bed 11 and the resultant carbon monoxide CO and nitrogen monoxide NO are subjected to contact reduction reaction with the calcium compounds dropping from the upper fluidized bed 13 being used as catalysts. Secondary air is introduced from the exterior into the upper fluidized bed 13 in which solid particles of lime stone are fluidized to burn unburned, $SO_2$-containing gases from the lower fluidized bed 11, thereby effecting desulfurization. Concurrently, recirculated exhaust gases are introduced to control the temperature of the upper fluidized bed 13, thereby inhibiting the generation of $NO_x$ during the secondary combustion.

More particularly, the combustion furnace 8 includes a wind box 9, a distributor 10, the lower or primary fluidized bed 11, the partition device 12, the upper or secondary fluidized bed 13 and a freeboard 14. Heat transfer coils 15 are inserted into the lower fluidized bed 11, the upper fluidized bed 13 and the freeboard 14, respectively.

Coal C is fed through a feed pipe 16 into the lower fluidized bed 11 on the gas distributor 10. Particles of lime stone S are fed through a feed pipe 17 into the upper fluidized bed 13.

Figure 2:
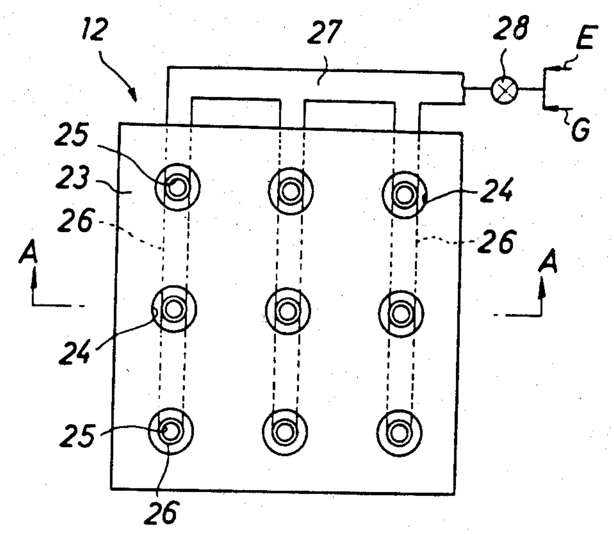
FIG. 2 is a top view of a first embodiment of a partition device in accordance with the present invention used in the furnace or reactor shown in FIG. 1.
Figure 3:
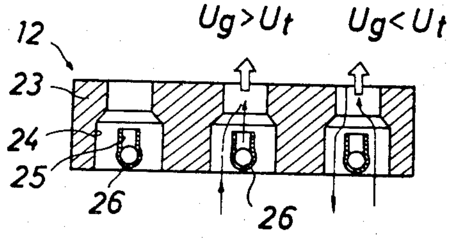
FIG. 3 is a sectional view taken along the line A—A of FIG. 2.
Figure 4:
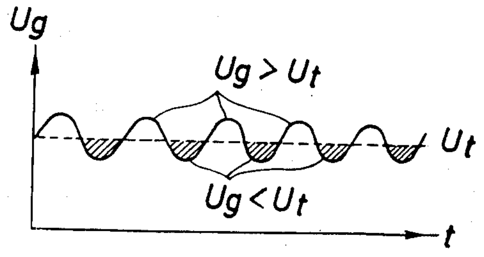
FIG. 4 is a graph used for the explanation of the mode of operation of the partition device shown in FIGS. 2 and 3.

The lower and upper fluidized beds 11 and 13 are separated from each other by the partition device 12 as shown in FIGS. 2 and 3. The partition device 12 comprises a partition plate 23 provided with a plurality of gas distribution holes 24 in which are disposed gas nozzles 25 coaxially thereof. The gas nozzles 25 in each array or column are communicated through a feed pipe 26 with a header 27 which in turn is communicated with an exhaust gas booster 19 and a main blower 20 (See FIG. 1) through a motor-driven valve (or a rotary valve) 18. Therefore both the exhaust gases G and the combustion or secondary air E are forced into the upper fluidized bed 13 through the gas nozzles 25. By controlling the flow rates of the exhaust gases G and the secondary or combustion air E, the fluidized particles M in the upper bed 13 are dropped into the lower fluidized bed 11. That is, in order to permit the fluidized particles M to drop into the lower fluidized bed 11, various design factors are so selected that the velocity $U_g$ of gases flowing out of the distribution hole 24 may be accelerated faster than the terminal velocity $U_t$ of the fluidized particles M and that when the motor-driven valve 18 is closed, the velocity $U_g$ becomes less than the velocity $U_t$. Then the velocity $U_g$ may be pulsated or fluctuated as shown in FIG. 4 and when $U_g$ is less than $U_t$ the fluidized particles M drop into the lower fluidized bed 11.

Combustion air is also supplied from the main blower 20 to the wind box 9 below the lower fluidized bed 11 and is distributed through the gas distributor 10 so that the combustion of coal C in the lower fluidized bed 11 may be facilitated and the fluidization of solid particles may be enhanced. Exhaust gases from the reactor 8 are discharged through a cyclone 21 and part of the exhaust gases discharged from the cyclone 21 is fed to the exhaust gas booster 19 which recirculates the exhaust gases through the valve 18 into the partition device 12 as described above.

The upper end of a discharge pipe 22 is attached to the gas distributor 10 so as to discharge the particles M to the exterior of the reactor 8.

Next the mode of operation of the reactor 8 with the above construction will be described. Particles of lime stone are previously fed into the lower and upper fluidized beds 11 and 13. Combustion air is supplied from the main blower 20 and is distributed uniformly into the lower fluidized bed 11 through the gas distributor 10, whereby the primary fluidized bed may be formed. Next an ignition burner 28 is ignited so that the temperature of the fluidized bed 11 may be raised above the ignition temperature of coal C. Then, as coal particles C are fed through the feed pipe 16 into the lower fluidized bed 11, they are burned. When combustion air rate is less than stoichiometric condition, reducing gases containing CO are produced in the lower fluidized bed 11 so that NO generated in the lower fluidized bed 11 may be removed by the contact reduction reaction with CO with CaO and part of $CaSO_4$ serving as catalysts.

Exhaust gases free from $NO_x$ flow from the lower fluidized bed portion 11 into the upper fluidized bed portion 13 through the gas distribution holes 24 of the partition device 12. As described elsewhere, combustion air is charged into the upper fluidized bed 13 from the main blower 20 through the valve 18, the header 27, the distribution pipes 26 and the nozzles 25 so that the unburned gases in the exhaust gases from the lower fluidized bed 11 are burned completely while they are passing through the upper fluidized bed 13 and the freeboard 14. $SO_2$ and $SO_3$ which are produced and remain in the upper fluidized bed 13 react with fluidized particles M of lime stone S and are converted into $CaSO_3$ and $CaSO_4$ which remain in the upper fluidized bed 13 as the bed or fluidized particles M together with CaO which has not been reacted.

Fluidized or bed particles M drop into the lower fluidized bed 11 as described above and become the bed or fluidized particles thereof. The bed or fluidized particles in the lower fluidized bed 11 are discharged through the discharge pipe or chute 22 to the exterior of the reactor 8. Thus the lower and upper fluidized beds 11 and 13 may be maintained at predetermined levels or depths.

Exhaust gases free from $NO_x$ and $SO_x$ flow into the cyclone 21 where unburned particles and ash are removed so that clean gases may be discharged into the surrounding atmosphere. Part of exhaust gases are recirculated through the booster 19 into the reactor 8 in the manner described above to cause the bed or fluidized particles M to drop from the upper fluidized bed 13 into the lower fluidized bed 11 as described elsewhere and to the production of thermal $NO_x$ in the upper fluidized bed 13. The above-described steps are cycled so that very effective and efficient desulfurization and denitrification may be attained.

Figure 5:
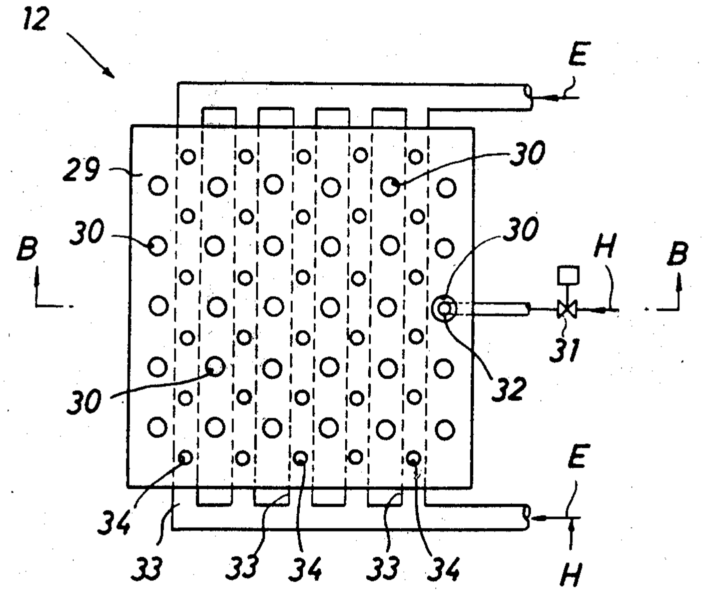
FIG. 5 is a top view of another embodiment of a partition device in accordance with the present invention.
Figure 6:
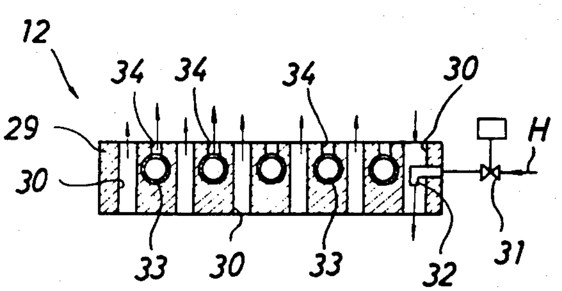
FIG. 6 is a sectional view taken along the line B—B of FIG. 5.

Another embodiment of the partition device 12 is shown in FIGS. 5 and 6 which is used to forcibly drop the bed or fluidized particles M. It comprises a partition or separation plate 29 formed with arrays of exhaust gas distribution holes 30. In some of these distribution holes 30 (only one in FIGS. 5 and 6) there is provided an injection nozzle 32 for injecting air or recirculated exhaust gases H which is oriented downwards and is connected to a motor-driven valve 31 so that the air or the recirculated exhaust gases H may be injected intermittently or periodically. A plurality of feed pipes 33 are extended through the partition plate 29 and each communicated with an array of nozzles 34 arranged in staggered relationship with the distribution holes 30 so that the secondary air E and the recirculated exhaust gases H may be discharged into the secondary fluidized bed 13.

In operation, the air or the recirculated exhaust gases H are intermittently or periodically injected through the nozzle 32 so that the bed or fluidized particles in the vicinity of the distribution hole 30 may be forced to drop into the lower fluidized bed 11.

With the partition device 12 shown in FIGS. 2 and 3 or FIGS. 5 and 6, not only the exhaust gases may be discharged from the lower fluidized bed 11 to the upper fluidized bed 13 through the distribution holes 24 or 30 but also the bed or fluidized particles M may be dropped from the upper fluidized bed 13 into the lower fluidized bed 11 through the same holes when the air and/or the recirculated exhaust gases are made to intermittently or periodically flow through them.

Since the partition device 12 is provided with a plurality of nozzles 25 or 34 through which issue the combustion air and/or recirculated exhaust gases, the partition device 12 may be self-cooled so that the exhaust gas distribution holes 24 or 30 may be prevented from being overheated.

So far the present invention has been described in detail in conjunction with the burning of coal, but it is to be understood that the present invention may be equally applied to the reactors which burn heavy oil, and other gas fuels.

The effects, features and advantages of the present invention may be summarized as follows:

(1) Calcium compounds produced in the upper fluidized bed may be dropped into the lower fluidized bed and used as reducing catalysts so that stable, efficient and effective denitrification may be carried out in the lower fluidized bed.

(2) All of the combustion gaes produced in the lower fluidized bed may be made to pass through the upper fluidized bed in contact with the particles of lime stone so that the positive desulfurization may be ensured.

(3) Recirculated exhaust gases may be selectively charged into the upper fluidized bed so that the production of thermal $NO_x$ may be inhibited in the upper fluidized bed.

(4) The partition device is provided with a plurality of gas feed nozzles through which issue the gases (combustion air and/or recirculated exhaust gases) supplied from the exterior of the reactor so that overheating of the partition device may be prevented and consequently long service life of the partition device may be ensured.

(5) When some of the exhaust gas distribution holes are provided with downwardly directed injection nozzles, the bed or fluidized particles may be forced to drop from the upper fluidized bed to the lower fluidized bed.

What is claimed is:

1. In a chemical reactor having a multi-stage fluidized bed arrangement and provided with at least an upper and a lower fluidized bed system, said systems forming zones in which fluidized beds and bed particles containing particles of limestone are formed, wherein the lower fluidized bed is provided with a fuel feeding means and a combustion air supply means, the improvement comprising: a plate-shaped partition device located between said upper and lower fluidized bed systems, said partition device being formed with a plurality of exhaust gas distribution holes therein for distributing the exhaust gases from said lower fluidized bed into said upper fluidized bed, and wherein the upper end of said zone forming said lower fluidized bed and the lower end of said zone forming said upper fluidized bed are communicated through said partition device, said partition device having formed thereon a plurality of nozzles connected to said combustion air supply means for introduction of combustion air thereto and to an exhaust gas recirculation means for introducing recycled gases discharged after combustion into said reactor, at least some of said nozzles being directed downwardly, the gases discharged after combustion having no oxygen content, said exhaust gas recirculation means being part of an exhaust gas recirculation system by means of which part of the exhaust gases discharged from said reactor is introducible into said upper fluidized bed through said nozzles of said partition device.

* * * * *